Patented Nov. 18, 1952

2,618,565

UNITED STATES PATENT OFFICE 2,618,565

MANUFACTURE OF SILICON NITRIDE-BONDED ARTICLES

Kenneth C. Nicholson, Niagara Falls, N. Y., assignor to The Carborundum Company, Niagara Falls, N. Y., a corporation of Delaware No Drawing. Application February 26, 1948, Serial No. 11,358

8 Claims. (Cl. 106—44)

This invention relates to materials and articles consisting of and/or bonded by silicon nitride and to compositions and methods for their manufacture. It is particularly concerned with the manufacture of silicon nitride products and products bonded with silicon nitride, in which the silicon nitride is formed by conversion of silicon to silicon nitride during the manufacture of the body and wherein a catalyst is used for promoting the conversion of the silicon to silicon nitride.

Various bodies can be made which either consist entirely of silicon nitride or which are composed of particles of a refractory material other than silicon nitride with the refractory particles held together by an interstitial silicon nitride bond. In either form of product the silicon nitride is provided by compressing a mass of finely divided silicon metal alone or of finely divided silicon metal thoroughly mixed with the granular refractory components and firing the resulting mass or shape in an atmosphere containing nitrogen and at a temperature at which the silicon metal is converted to silicon nitride.

The manufacture of such products involves, however, a number of difficulties and disadvantages. For example, in order to bring about a reasonably efficient and thorough reaction of the silicon with nitrogen it has been found necessary to raise the temperature close to the melting point of the silicon metal without actually reaching that temperature, thus requiring a close control over the temperature of the reaction chamber in order to avoid fusing the silicon before it has had an opportunity to react with the nitrogen and be converted to silicon nitride. When any appreciable melting of the silicon takes place it interferes with the nitriding reaction and to a large extent prevents the reaction from taking place. Furthermore, even under the best of conditions the reaction between the silicon and nitrogen by which the silicon is completely converted to silicon nitride is not an instantaneous reaction but is one which requires a relatively long period of time to be completed. As the bulk of the desired mass or shape increases, the difficulties of bringing about complete conversion of the silicon to silicon nitride within a reasonable length of time correspondingly increase.

It is an object of the present invention to provide improved compositions and methods for converting the silicon to silicon nitride in the formation of silicon nitride materials or articles and in the formation of materials or articles bonded by silicon nitride.

In accordance with the present invention the conversion of silicon to silicon nitride in the making of bonded masses or shapes composed of or containing silicon nitride is carried out in the presence of a small amount of a catalyst which promotes the rate of reaction between the silicon and the nitrogen to form silicon nitride, with the result that the reaction can be carried out not only at a lower temperature than that required for the reaction without the use of a catalyst but the reaction can be carried to substantial completion in a shorter period of time than is required when no catalyst of the type herein disclosed is used.

In carrying out the present invention the body or article is formed or molded by any of the usual methods employed in the ceramic art from a mixture of refractory granules and a finely divided silicon metal or substantially entirely of silicon metal in case the body or article is to consist of self-bonded silicon nitride. Among those granular refractory materials which can be used with silicon to form silicon nitride bonded shapes are included silicon carbide fused alumina and other refractory oxides, mullite and the like. The resulting body is dried, after which it is fired in a non-oxidizing, nitrogenous atmosphere at temperatures usually between 1250° and 1420° C. in the presence of a suitable catalyst.

The catalyst is usually provided by being incorporated within the mix from which the article is molded, although it is possible to provide the catalyst by introducing it into the atmosphere of the furnace. Among those materials which I have found satisfactory as catalyzing agents in the formation of silicon nitride bonded articles or masses are fluorine-bearing materials such as the inorganic fluorides, as, for example, barium fluoride, calcium fluoride, sodium ferric fluoride, potassium ferric fluoride, and cryolite. As low as ½% of a fluoride is effective in promoting the conversion of silicon to silicon nitride and it is desirable to keep the percentage of catalyst below approximately 5% by weight because greater amounts of the catalyzing agent tend to lower the refractoriness of the resulting article. Around 1% of catalyst has been found satisfactory for promoting conversion.

Silicon nitride bodies or shapes obtained by forming the article entirely of silicon metal and then nitriding to silicon nitride by firing in an atmosphere of nitrogen have been chemically analyzed in order to establish their composition. The following is a typical analysis obtained:

| | Per cent |
|---|---|
| Silicon | 58.23 |
| Nitrogen | 38.28 |
| Alumina and iron oxide | 2.72 |

When the above analysis is recalculated to an iron oxide-alumina-free basis it shows a silicon content of 59.9% and a nitrogen content of 39.4%. This corresponds closely to the formula $Si_3N_4$ which has a theoretical composition of 60.04% silicon and 39.96% nitrogen. It is therefore reasonable to assume that bodies made according to the present invention have been formed and bonded by reason of the following chemical reaction and that the silicon content thereof has been converted to silicon nitride having the formula $Si_3N_4$ in accordance with the following chemical equation:

$$3SI + 2N_2 \rightarrow Si_3N_4$$

The theoretical gain in weight in converting silicon metal to silicon nitride having the formula $Si_3N_4$ is 66.67%. Therefore, upon complete conversion of the silicon therein to silicon nitride the article should gain in weight theoretically an amount equal to 66.67% of the weight of the silicon metal content of the unfired article. Actual experience has shown that silicon nitride bonded bodies formed in accordance with the teachings herein undergo a gain in weight when satisfactorily bonded of 55% or more of the weight of the silicon content in the unfired article and usually show a gain in weight of around 60% of the weight of the silicon in the article. It is suspected that the entire theoretical gain in weight is not attained because of the loss of some silicon by volatilization during the nitriding operation, the amount lost being estimated to be in the neighborhood of 4%. In calculating the amount of conversion from silicon to silicon nitride it is necessary also to take into consideration and make compensation for any loss in weight during firing because of the volatilization of temporary binders if such have been used.

Using the gain in weight as a gauge of the degree of conversion to silicon nitride by nitriding under various conditions and in the presence of various materials, it has been found that articles nitrided in the presence of catalytic materials such as fluorides are nitrided much more readily and thoroughly than articles of similar size and shape nitrided in the absence of such catalytic agents.

The extent to which small amounts of a fluoride catalyze the reaction between silicon and nitrogen is best shown by the following table in which the results of nitriding an article molded of 200 mesh and finer silicon powder of commercial grade in the absence of a fluoride catalyst are compared with the nitriding of an article of the same size and shape composed of the same grade and particle size of silicon powder containing a small amount of a fluoride.

A typical analysis of the commercial grade of silicon discloses, in addition to silicon, the following impurities:

| | Per cent |
|---|---|
| Iron | 0.87 |
| Chromium | 0.21 |
| Aluminum | 0.60 |
| Calcium | 0.54 |

In order to obtain a conversion of the silicon to silicon nitride within a reasonable period of time when a commercial grade silicon powder of the above type is used the silicon should be fine enough to pass through a screen of around 200 mesh size (U. S. standard sieve) and finer, which, in other words, would be material 70 to 90 microns particle size and finer. More rapid nitriding is obtained when the silicon is of a fineness in the neighborhood of 10–20 microns and finer.

It is plain from the table below that the presence of a small amount of a fluoride produced a greater amount of nitriding as compared with the amount of nitriding produced when commercial grade silicon containing no fluoride or containing small amounts of various other materials were used.

| Material Added to Commercial Grade Silicon | Conditions of Nitriding in Stream of Nitrogen | | Gain in Weight |
|---|---|---|---|
| | Period of Nitriding in Hours | Average Temperature of Nitriding in Degrees Centrigrade (including Mean Deviation) [1] | |
| | | | Percent |
| 2% $BaF_2$ | 3½ | 1,324° C. ± 5 | 48.9 |
| 2% $CaF_2$ | 2½ | 1,342° C. ± 7 | 50.2 |
| 2% Beryl | 4 | 1,332° C. ± 3 | 13.9 |
| 2% Rutile ($TiO_2$) | 5 | 1,331° C. ± 4 | 29.1 |
| 1½% $Mg_2P_2O_7$ | 3 | 1,341° C. ± 11 | 28.2 |
| | 4 | 1,365° C. ± 7 | 17.5 |

[1] The average temperatures and mean deviations in the above table were calculated in accordance with the system set forth on pages 15 to 17 in "Elements of the Precision of Measurements & Graphical Methods" by H. M. Goodwin (McGraw-Hill Book Company, New York City—1913).

The silicon of the above and of the following examples was the commercial grade, but the present invention is not limited to the use of such material because I have found that the catalysts are effective also in reducing the time and/or temperature required for nitriding pure silicon (99.8% Si) and pure silicon to which iron has been added.

When catalysts are used it is also possible to lower the temperature at which the reaction is carried out and still effect a substantially complete conversion of the silicon content of the article to silicon nitride. The beneficial effect of the catalyst in promoting the reaction between silicon and nitrogen is usually taken advantage of not only to shorten the period of time required for the nitriding operation but also to lower somewhat the temperature at which the reaction is allowed to take place in order to avoid carrying on the reaction at temperatures too close to the melting point of the silicon, at least in the early stages of the nitriding reaction.

In order that the invention may be more fully understood the following specific examples are submitted to illustrate the invention and the manner in which it is carried out:

*Example I*

Lens fusion blocks 3" square and from ½" to ¾" in thickness with a convex upper surface and composed substantially entirely of silicon nitride have been made as follows:

Commercial grade silicon metal of 200 and finer mesh size is mixed with 2% by weight of finely divided calcium fluoride and 1½% dextrin temporary binder, the mixture moistened with water to bring it to press-molding consistency, placed in a mold and pressed at 1400 pounds per square inch to the desired shape. The silicon by analysis is shown to contain, in addition to silicon, the following impurities:

| | Per cent |
|---|---|
| Iron | 0.87 |
| Chromium | 0.21 |
| Aluminum | 0.60 |
| Calcium | 0.54 |

The formed articles are dried and placed in a muffle furnace and the normal atmosphere of the muffle replaced by a continuous stream of commercial grade nitrogen. While maintaining a continuous stream of nitrogen into the furnace muffle the temperature of the furnace chamber is gradually raised to 1400° C. and held at that temperature for four hours. The furnace with nitrogen still flowing then is cooled to room temperature or to a point where the material can be conveniently handled and the finished lens fusion blocks, composed substantially entirely of silicon nitride, are removed from the furnace and are ready for use. The resulting blocks are dark grey in color, dense and mechanically strong.

*Example II*

This example illustrates the use of a mix that is suitable for making bonded silicon carbide refractory shapes such as bricks and the like where a prime requisite is high strength at elevated temperatures and a relatively high degree of resistance to oxidation.

| | Parts by weight |
|---|---|
| 14 and finer silicon carbide grain | 70 |
| Colloidal silicon carbide | 10 |
| 200 mesh and finer commercial grade silicon (same as used in Example I) | 20 |
| Finely divided barium fluoride | 2 |
| Dry lignone | 3 |

The silicon carbide grain is selected in a gradation of grit sizes such as to produce a maximum density. The colloidal silicon carbide, silicon, barium fluoride and lignone are thoroughly mixed dry after which they are admixed dry with the balance of the silicon carbide grain, followed by mixing wet in a kneader mixer, sufficient water being added to bring the mix to a pressure-molding consistency. Bricks 9″ x 4½″ x 1¼″ in size, commonly known in the trade as splits, are then formed by pressing in a hydraulic press at 6200 pounds per square inch. The shaped articles are then dried in the usual manner at 220° F. and fired in an atmosphere of nitrogen, obtained by replacing the normal atmosphere of the furnace chamber with nitrogen. In firing the articles, the temperature is slowly raised (100° C. per hour) to 1400° C., and then held at 1400° C. for 14 hours while a flow of nitrogen into the furnace chamber is maintained. The furnace is then allowed to cool below about 800° C. with nitrogen still flowing, and the articles are removed and are ready for use.

Bonded silicon carbide splits so made from the above composition when tested for strength at 1350° C. have a modulus of rupture of over 6700 pounds per square inch. The same splits, when subjected to a spalling test in which in each cycle of the test the bricks are heated to 1300° C. at one end, withdrawn from the furnace and exposed, without delay, to a blast of cold air, withstood 6 cycles before spalling. Nitride bonded silicon carbide bodies of the same type showed very little oxidation when exposed to an accelerated oxidation test, as indicated by only very slight gains in weight over prolonged periods of time.

While I have described in the above examples the making of various molded shapes in which the article is molded and nitrided in the exact shape and form in which it is intended for use, the present invention is not intended to be so restricted. Another way of making and using silicon nitride bonded bodies of the present invention is to mold the raw batch of material into briquettes or other shapes or otherwise compress a mass of the material having a composition the same as or similar to those given earlier herein for making the articles of the specified examples, after which the resulting compressed bodies are nitrided in the manner already described. After removal from the furnace, they are crushed to granular form of the desired grit size. The resulting granular material can then be used in loose granular form as a high temperature insulation material, as, for example, insulation around jet engines and rocket combustion chambers, or as a layer of insulation around industrial furnace chambers. It may also be used as a loose filtering media or as a catalyst or catalyst carrier material. The granular material can also be bonded by means of sintered metals, vitreous or ceramic bonds or other bonding materials to form articles suitable for many of the industrial uses set forth elsewhere herein.

Likewise, articles or bodies can be made in accordance with the present invention in which pore-forming materials are incorporated in the raw batch from which the body is made for the purpose of providing a greater degree of porosity in the final body. The pore-forming material selected for the purpose preferably should not be one such as carbon or the like which requires oxidation for removal from the body in which case a preliminary burning out of the pore-forming materials at lower temperatures would be required, but should be a material which is removed by volatilization during the drying and/or firing operation such as powdered or granular naphthalene, various organic resinous materials such as phenolic resins and the like or one which provides pores by reason of the generation of a gas. The resulting bodies having greater porosity than those made with no pore formers are particularly useful in the fabrication of porous filtering media, catalysts and catalyst carriers, insulation bodies and the like, whether in crushed granular form or in the form of molded shapes of predetermined contour.

Although nitrogen gas has been mentioned for use in the examples set forth above, similar results can be obtained with the use of other non-oxidizing atmospheres containing nitrogen. For example, commercial annealing hydrogen which has an approximate analysis of 93% nitrogen and 7% hydrogen, or ammonia gas can be similarly used in place of nitrogen.

It is to be understood that the products of the present invention in its various modifications are not limited to any specific field or fields of use such as might be defined by the specific examples previously set forth. The products can be made in any desired shape as well as provided in granular or aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specially high temperature applications, such as jet engine combustion chambers, linings for exhaust nozzles, rocket combustion chambers and exhaust nozzles, turbine blades, stator blades, lens fusion blocks, spark plug bodies, and the like. They are also suitable for the fabrication of laboratory ware, including combustion boats, crucibles, burner holders, and other shapes. The resistance of such bodies to chemical attack make them highly suitable for the making of articles used in the containing, conveying and handling of many acids, alkalies and other corrosive chemicals, including such articles as chambers and chamber linings, crucibles, pipes and pipe fittings, and other sundry shapes. The bodies of the present invention, particularly when modified by the use of pore formers in the raw batch from which the bodies are made, are also highly useful as diffusion and filtering media, such as diffusion tubes and plates, filtering tubes, plates and shapes, or as catalysts or catalyst carriers and supports. Materials and articles of the present invention can also be made for abrasive purposes such as grinding wheels, sharpening stones, razor hones, and other grinding and polishing shapes and materials. The dielectric properties make the present bodies useful in many articles in the electrical and radio industry including supports in electric light bulbs, radio tubes, X-ray tubes and radar equipment, resistors and grid leaks. Other miscellaneous uses include its use as thread guides, wire drawing dies, blasting nozzles, heating elements and the like.

Having described the invention, it is desired to claim:

1. A bonded article having a silicon nitride bond having the chemical formula $Si_3N_4$, said article containing approximately 1% by weight of a fluoride based on the amount of the nitride bond.

2. A bonded article comprising silicon nitride having the chemical formula $Si_3N_4$, said article containing approximately ½% to 5% by weight of a fluoride based on the weight of the silicon nitride content.

3. A raw batch for the manufacture of bonded articles having a silicon nitride bond in which the silicon nitride has the chemical formula $Si_3N_4$, said raw batch comprising finely divided silicon and approximately ½% to 5% of a fluorine compound.

4. A raw batch for the manufacture of bonded silicon carbide articles having a silicon nitride bond in which the silicon nitride has the chemical formula $Si_3N_4$, said raw batch comprising granular silicon carbide, finely divided silicon and ½% to 5% of a fluoride.

5. In the process of making bonded shapes having a silicon nitride bond, the steps of molding the desired shape from a mixture containing silicon and firing the molded shape in a non-oxidizing, nitrogenous atmosphere in the presence of a fluorine compound, to convert the silicon to silicon nitride having the chemical formula $Si_3N_4$.

6. In the process of making bonded shapes having a silicon nitride bond, the steps of molding the desired shape from a mixture containing silicon and firing the molded shape in a non-oxidizing, nitrogenous atmosphere in the presence of a small amount of calcium fluoride, to convert the silicon to silicon nitride having the chemical formula $Si_3N_4$.

7. A bonded article comprising silicon nitride having the chemical formula $Si_3N_4$, said article containing ½% to 5% by weight of an inorganic fluoride based on the weight of the silicon nitride content.

8. A bonded article comprising silicon nitride having the chemical formula $Si_3N_4$, said article containing ½% to 5% by weight of calcium fluoride based on the weight of the silicon nitride content.

KENNETH C. NICHOLSON.

REFERENCES CITED

The following references are of record in the file of this patent:

UNITED STATES PATENTS

| Number | Name | Date |
|---|---|---|
| 866,444 | Egly | Sept. 17, 1907 |
| 962,170 | Sinding-Larsen | June 21, 1910 |
| 2,467,647 | Alexander | Apr. 19, 1949 |

FOREIGN PATENTS

| Number | Country | Date |
|---|---|---|
| 234,129 | Germany | 1911 |
| 56,335 | Sweden | 1922 |

OTHER REFERENCES

J. W. Mellor: Comprehensive Treatise on Inorganic and Theoretical Chemistry, vol. 8, pages 115, 116, and 117 (1928).